(12) United States Patent
Kelly et al.

(10) Patent No.: US 9,309,061 B2
(45) Date of Patent: *Apr. 12, 2016

(54) APPARATUS AND METHOD FOR PRODUCT COUNTING, GROUPING AND DISCHARGING

(71) Applicant: Kraft Foods Group Brands LLC, Northfield, IL (US)

(72) Inventors: Gregory J. Kelly, Lewes, DE (US); Douglas M. Lehmann, Park Ridge, NJ (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,879

(22) Filed: Jan. 30, 2014

(65) Prior Publication Data

US 2014/0174884 A1    Jun. 26, 2014

Related U.S. Application Data

(63) Continuation of application No. 12/888,786, filed on Sep. 23, 2010, now Pat. No. 8,708,132.

(60) Provisional application No. 61/247,807, filed on Oct. 1, 2009.

(51) Int. Cl.
| | |
|---|---|
| *B65G 47/26* | (2006.01) |
| *B65B 35/44* | (2006.01) |
| *B65B 57/20* | (2006.01) |
| *A23N 15/00* | (2006.01) |
| *B65G 47/24* | (2006.01) |
| *B65G 47/08* | (2006.01) |

(52) U.S. Cl.
CPC .............. *B65G 47/261* (2013.01); *A23N 15/00* (2013.01); *B65B 35/44* (2013.01); *B65B 57/20* (2013.01); *B65G 47/24* (2013.01); *B65G 47/08* (2013.01)

(58) Field of Classification Search
CPC ........ B65B 35/44; B65B 57/20; B65B 19/34; B65B 35/50; B65G 47/261
See application file for complete search history.

(56) References Cited

U.S. PATENT DOCUMENTS

| | | | |
|---|---|---|---|
| 3,033,418 A | | 5/1962 | Hollopetre |
| 3,191,927 A | * | 6/1965 | Hartbauer .............. B65H 29/66 |
| | | | 271/202 |
| 3,359,874 A | * | 12/1967 | Stegenga ............... B65H 43/00 |
| | | | 198/418.9 |
| 3,450,249 A | | 6/1969 | Poll |

(Continued)

*Primary Examiner* — William R Harp

(74) *Attorney, Agent, or Firm* — Fitch, Even, Tabin & Flannery LLP

(57) ABSTRACT

An apparatus and method to efficiently and accurately count, group and discharge individual products from a production line. The apparatus and methods are suitable for a variety of products, including products with irregular shapes, and/or products that travel down production lines at irregular intervals. In one embodiment the apparatus can have a delivery conveyor having a product sensor; a grouping conveyor adjacent to the delivery conveyor having a plurality of containment areas to receive a plurality of products; and a controller communicatively connected to the delivery conveyor, the grouping conveyor, and the product sensor, the controller configured to count product traveling on the delivery conveyor during a grouping sequence and to discharge a product group from the grouping conveyor during a discharge sequence at a predetermined product count. The grouping conveyor can be at substantially right angles to the delivery conveyor.

15 Claims, 1 Drawing Sheet

(56) References Cited

U.S. PATENT DOCUMENTS

| | | | |
|---|---|---|---|
| 3,683,758 A * | 8/1972 | Feldkamper | B65H 29/66 271/3.01 |
| 3,724,640 A * | 4/1973 | Rapparlie | B65H 31/28 271/213 |
| 3,815,723 A | 6/1974 | Wright et al. | |
| 3,866,741 A * | 2/1975 | Carbon | B65G 57/11 198/402 |
| 4,034,846 A | 7/1977 | Burgis et al. | |
| 4,135,616 A * | 1/1979 | Pellaton | B65B 35/50 198/418.9 |
| 4,255,651 A | 3/1981 | Phillips | |
| 4,262,793 A | 4/1981 | Hebenstreit et al. | |
| 4,590,743 A | 5/1986 | Hardage | |
| 4,633,652 A | 1/1987 | Dagenais et al. | |
| 5,127,209 A | 7/1992 | Hunter | |
| 5,829,951 A * | 11/1998 | Adami | B65H 29/66 414/789 |
| 5,871,078 A | 2/1999 | Arnarson et al. | |
| 6,019,213 A | 2/2000 | Schubert | |
| 7,069,845 B2 | 7/2006 | Righele | |
| 7,654,381 B2 | 2/2010 | Webb | |
| 8,708,132 B2 * | 4/2014 | Kelly | B65B 35/44 198/418 |
| 2011/0079490 A1 | 4/2011 | Kelly et al. | |

* cited by examiner

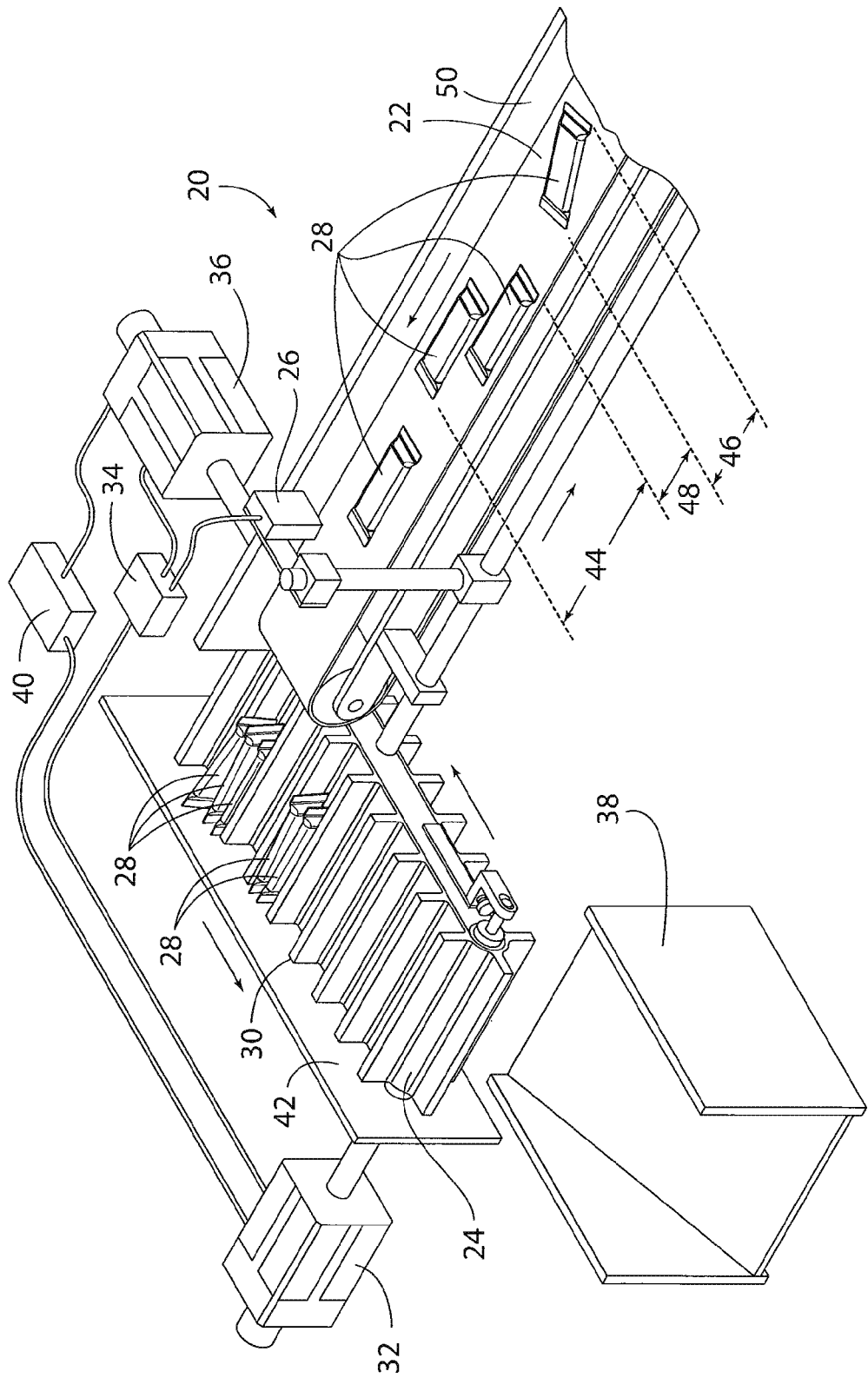

APPARATUS AND METHOD FOR PRODUCT COUNTING, GROUPING AND DISCHARGING

CROSS-REFERENCE TO RELATED APPLICATIONS

This application claims priority from, and is a continuation of U.S. patent application Ser. No. 12/888,786, file Sep. 23, 2010, which in turn claims priority from U.S. provisional patent application No. 61/247,807, filed 1 Oct. 2009, both of which are hereby incorporated by reference.

FIELD

A product counting, grouping and discharging apparatus and method, and specifically a fast and efficient apparatus and method to provide an accurate count and discharge of a predetermined grouping of individual products.

BACKGROUND

Individual products from production lines are frequently packed and stored in larger containers for shipping and storage. When these products are packed in a specific quantity, an accurate product count is important for consumer expectations, available volume of the container, manufacturing profitability, and the like. Although there are means known in the art to count individual products as they are produced, this can be made difficult when the product has an irregular or non-uniform shape, travels down a production line with an irregular frequency, or has been removed and then returned to the production line after an initial product count. Often in these circumstances the products are hand counted and hand packed into the container.

One attempt in the art has been to develop a system that accurately delivers symmetrically shaped products onto an endless conveyor having entrainment members. (See U.S. Pat. No. 6,019,213 to Shubert) In Shubert, the apparatus delivers one product to one correspondingly shaped entrainment member on an endless conveyor. The corresponding shape assures one product for one entrainment member. Also, in one Shubert embodiment, a set of photoelectric cells working with a 'pusher' ejects products that are too close together in sequence that would effect the indexing of a delivery conveyor with the entrainment conveyor.

While there have been significant advances in the art, further advances are possible and desired. For example, it is desirable to provide an apparatus and method that does not require the use of multiple counting means on a delivery conveyor. It would also be desirable to simplify such an apparatus to reduce the precision needed for indexing product delivery with an entrainment conveyor, while also accurately handling irregular shaped products. Further, it is desirable to not eject a product from the delivery line for any reason as in Shubert, since this step would require further handling and system complexity to accommodate.

SUMMARY

Accordingly, there is provided herein an apparatus and method to efficiently and accurately count, group and discharge individual products from a production line. The products can be discharged through a chute or 'bomb bay' holder into, for example, a container such as a cardboard box. The apparatus and method are suitable for a variety of products, including products with irregular shapes, and/or products that travel down production lines at irregular intervals.

In one embodiment the apparatus can have a delivery conveyor having a product sensor; a grouping conveyor adjacent to the delivery conveyor having a plurality of containment areas to receive a plurality of products; and a controller communicatively connected to the delivery conveyor, the grouping conveyor, and the product sensor, the controller configured to count product traveling on the delivery conveyor during a grouping sequence then command the grouping conveyor to discharge a product group from the grouping conveyor during a discharge sequence at a predetermined product count. The grouping conveyor can be at substantially right angles to the delivery conveyor.

Additional features can include the controller determining product count from a determination of gaps between product on the delivery conveyor and a sensed product length. Product length can be determined by a calibrated speed of the delivery conveyor. The controller can determine an initial product count by the number of product gaps and adds additional counts in proportion of a sensed product length beyond a predetermined single product length.

The product count can add one product count where the product length is substantially equal to a predetermined product length and adds two product counts where the measured product length is substantially greater than the predetermined product length. The controller can add three product counts where the measured product length is substantially greater than twice the predetermined product length, and so on.

In some embodiments, the plurality of containment areas can be defined by a plurality of partitions. These can be straight partitions, "U" shaped, or "V" shaped.

In other embodiments, a chute can be added for receiving the group of products and for holding them until an empty container available into which the product can deposited.

Embodiments can include methods of counting, grouping and discharging products, by irregularly distributing products on a delivery conveyor; counting the products on the delivery conveyor; delivering products to a plurality of containment areas on a grouping conveyor; and discharging the products from the grouping conveyor upon reaching a predetermined product count.

In some methods, the step of counting the products can include counting gaps between products; and measuring the length between product gaps.

Other methods can include, orienting the products in a generally common orientation on the delivery conveyor; and maintaining product orientation after delivery to the grouping conveyor.

Other methods can also include collecting products; delivering products to a vibrating feeder bowl; orienting and moving products up and out of the feeder bowl by vibration of a helical incline; controlling the number of products leaving the feeder bowl; and conveying the remaining products onto the delivery conveyor.

Other features will become more apparent to persons having ordinary skill in the art to which it pertains from the following description and claims.

BRIEF DESCRIPTION OF THE FIGURE

The foregoing features, as well as other features, will become apparent with reference to the FIGURE, in which like numerals represent elements, and in which the FIGURE illustrates a perspective view of an embodiment of a counting, grouping, and discharge apparatus.

DETAILED DESCRIPTION

The embodiments described below provide an apparatus and method to efficiently and accurately count, group and discharge individual products from a production line. The products can be discharged into, for example, a chute, and then into a container such as a cardboard box. The apparatus and method are suitable for a variety of products, including products with irregular shapes and/or products that travel down production lines at irregular intervals. The present embodiments can also be effective in production lines where there is a need to recount products that have been removed from a normal production, but need to be recounted and repackaged, rather than discarded.

For example, during the manufacture of an individual product, such as a powdered beverage stick packet, there can be many points in production where good quality packers are produced, yet removed from the production line. For example, packets can be removed because there was a disruption in the normal packing of the packet in a container (e.g., no container in the production line to put them in, incorrect number of packets causes a container to be rejected at a weight check point, container damage, and the like). These products can be salvaged, but are typically hand counted and hand packed. This is cost inefficient. The present apparatus and methods allow individual products to be counted, grouped and discharged, irrespective of normal production.

Generally, the embodiments described herein allow an accurate count, grouping and packaging of products that are irregular in shape and travel on conveyor systems at irregular intervals. Basic components of these embodiments can include a delivery conveyor and an adjacent grouping conveyor. As shown and described below, the grouping conveyor can be perpendicular to the delivery conveyor, though variations are possible. It is noted that for purposes of describing these embodiments the term conveyor is used to describe any means to move products through a production line, such as continuous belts, entrainments, chains, rollers, airveyors, screw conveyors, and the like.

The delivery conveyor can have a mechanism to count product before exiting onto the grouping conveyor. This can be done using a product sensor such as a photoelectric eye, laser, weight scales, inductive probes, capacitive probes, and the like. The product sensor can communicate with a controller that not only maintains counts of the gaps between products on the conveyor as an initial count, but can also measure product length. This can provide a more accurate count of products, especially when some product or products may be overlapping to some degree on the conveyor. The controller can use the product sensor coupled to a calibrated delivery conveyor speed to not only sense a gap between products, but also to determine a product length.

Turning now to the FIGURE, a counting, grouping, and discharging apparatus according to one embodiment is generally indicated at 20. Apparatus 20, as shown, has a delivery conveyor 22 and a grouping conveyor 24. Although grouping conveyor 24 is shown at right angles to delivery conveyor 22, in other embodiments the angle of orientation can be substantially "in-line" or at a variety of other angles. Delivery conveyor 22 can have a motive force applied by a motor 36 powered by a power source 40. Grouping conveyor 24 can similarly be moved by motor 32 powered by power source 40. Other aspects of delivery conveyor 22 can include a product sensing photoelectric eye 26, a backstop 50 and a means to urge a product 28 to travel adjacent to backstop 50 (not shown). Other aspects of grouping conveyor 24 can include a backstop 42; a partitioning means 30 to maintain product orientation (e.g., an "in-line" orientation as shown in the FIGURE); and a discharge chute 38. As shown, partition 30 can be a pleat, though it is noted that many types of partition designs to hold product 28 are possible, such as a 'V' or a 'U' shape so long as product 28 orientation can be maintained.

Motor speed and function to drive the conveyors can be controlled by a controller 34. Delivery conveyor motor 36 can have at least one predetermined speed and a stop mode. Grouping conveyor motor 32 can have at least one predetermined speed and even allow for indexing (i.e., advancing the grouping conveyer in incremental distances at incremental intervals).

One aspect of the present embodiment is the ability to accurately count product, even though the product may be irregularly shaped and traveling on delivery conveyor 22 at irregular intervals. Product sensor 26 can communicate with a controller 34, for example, to determine an initial product count by the number of gaps on the delivery conveyor where no product is present. This is shown as gap 48 in the FIGURE. Product sensor 26 can also communicate a product length to controller 34. Controller 34 can add product 28 counts in proportion of a sensed product length to a predetermined single product length.

For example, if the sensed distance between gaps (i.e., product length) is the predetermined length of a single product, such as distance 46 in the FIGURE, one count is added to the cycle. When the sensed product length is greater than the predetermined length of a single product, such as shown as distance 44, the controller can add an additional count to the cycle representing the additional adjacent product. Accordingly, if the sensed product length is more than double the predetermined product length, the controller can add 3 product counts. And so on.

Thus, if a product is, for example, 110 mm in length, controller 34 can count one product for each approximately 110 mm of measured product between gaps. If controller 34 measures, for example, a 150 mm of product between gaps, such as distance 44 in the FIGURE, controller 34 can count this as two products. To further increase the accuracy of the product count, other mechanisms can be placed on the delivery conveyor to minimize product stacking, maintain consistent product orientation on the conveyor, spread out the products on the conveyor, and to orient the product in-line against an adjacent backstop 50.

It is also important for controller 34 to accurately a track the distance traveled by delivery conveyor 22. This can be done by maintaining a consistent speed of conveyor 22 during a counting sequence or by tracking the distance conveyor 22 travels. A user programmable and predetermined product length can be stored within controller 34. A user programmable and predetermined tolerance can also reside within controller 34 to allow inaccuracies, while maintaining maximum accuracy. For example, a tolerance of up to about 45% of a product length could be used.

Another aspect of the present apparatus is the ability to group products. Grouping conveyor 24 can be configured to receive the counted products 28 from delivery conveyor 22 while also maintaining product orientation. For example, the FIGURE shows the product delivered roughly parallel to partition 30. Orientation can also be described as when the product does not change from a generally common orientation as it travels from conveyor 22 to grouping conveyor 24. Since the product is already counted on conveyor 22, there is no need to maintain an accurate count within each partition 30. As such, more than one product, or no product, are possible in any given partition 30 during a grouping cycle. Further, the product can be positioned in any variety of manner but preferably its general in-line orientation is maintained. For example, for some products can be flat as shown on conveyor 22 or vertical as shown on grouping conveyor 24, and any position in between. The speed of grouping conveyor 24 does not need to be indexed to match one partition for each product 28 delivered from delivery conveyor 22. Instead, grouping conveyor 24 can have a predetermined continuous or index speed that is sufficient to allow a group to be contained a top plane of the conveyor during a grouping cycle.

Once a predetermined count is reached, such as the number of products to be discharged into a container, the grouping cycle is completed and controller 34 can go into a discharge cycle. In the embodiment shown, delivery conveyor 22 can have a delivery speed, to deliver product 28 to grouping conveyor 24. But, in the discharge cycle, controller 34 can command delivery conveyor motor 36 to operate at a second slower speed, including being stopped altogether. This second speed is configured to halt product delivery to grouping conveyor 24 in the discharge cycle.

During the discharge cycle, controller 34 can also command grouping conveyor 24 to operate at a discharge speed to discharge the product group from the apparatus. As shown, discharge can be into a chute 38, which in turn discharges into a waiting product container (not shown). Discharge speed can simply be a cycle to rapidly complete one rotation of grouping conveyor 24, thus clearing grouping conveyor 24 of product.

In summary, product count is established on the delivery conveyor and placed as quickly as possible on the partitioned perpendicular grouping conveyor. Once a desired product count is reached, grouping conveyor 24 discharge speed can be significantly faster than the grouping speed and cycles through one rotation. Since the product has already been counted on the delivery conveyor, the controller knows when to speed up the grouping conveyor and slow down the delivery conveyor to allow discharge of the predetermined product count into, for example, a bomb bay hopper or chute for packaging.

Using the embodiment described above, a method of counting, grouping and discharging product is provided. The method can begin with the collecting of product at various loss points in production, then delivering them into a hopper. A conveyor, such as a pleated inclined conveyor, can meter product out of the hopper and deposit them into a bottom of a vibrating feeder bowl. Through vibration, the feeder bowl can orient the sticks to the top of the bowl on an incline in a helical pattern.

The next step can involve moving the product out of the feeder bowl incline. In one embodiment, this can be accomplished with small jets of air to orient the product and direct them into a chute. Once the oriented products enter the chute they can be directed to the delivery conveyor.

While in route to the delivery conveyor, an air jet, or other means, can be used to blow underweight products off the chute and/or redistribute the products so that only one stick is transferred to the delivery conveyor at a time. Excess products can be blown back into the feeder bowl.

Once the oriented and separated products begin travel down the delivery conveyor, a series of conveyors can be added to spread out a gap between the sticks for more accurate counting downstream. The products can also be directed to line up adjacent to delivery belt backstop 50. It is noted that in some embodiments the number of conveyors can be determinative of whether a vibrating feeder bowl is even needed to orient and separate product.

As the product completes its path along the delivery conveyor, the product is counted and delivered to the grouping belt for accumulation.

The grouping conveyor receives the product in its partitions as they are delivered. The grouping conveyor can travel or index slowly to spread the product out among a plurality of partitions.

When the predetermined number of product is delivered to the grouping conveyor, the method can go into a discharging sequence involving slowing or stopping the delivery conveyor while accelerating the grouping conveyor.

The next step can involve the chute or bomb bay hopper receiving the group of products and holding them until an empty container is available into which the product can deposited.

Thus, this configuration allows for several improvements in the art in that the grouping conveyor can maintain the orientation of the product even though there is no need for a specific number of products within each partition. There is also no need to coordinate the indexing of the grouping conveyor with the delivery conveyor since the product is already counted upstream. And further, there is no need for an exact spacing of the products on the delivery conveyor since the product sensor is able to count irregularly shaped products that can be irregularly spaced.

While the products and methods have been described in conjunction with specific embodiments, it is evident that many alternatives, modifications, and variations will be apparent to those skilled in the art in light of the foregoing description.

We claim:

1. An apparatus to count, group and discharge products, comprising:
   a delivery conveyor having a product sensor;
   a grouping conveyor adjacent to the delivery conveyor having a plurality of containment areas to receive a plurality of products; and
   a controller communicatively connected to the delivery conveyor, the grouping conveyor, and the product sensor, the controller configured to count products in a group of products traveling on the delivery conveyor during a grouping sequence then command the grouping conveyor to discharge the counted products in the group of products from the grouping conveyor during a discharge sequence at a predetermined count of the products in the group of products.

2. The apparatus of claim 1, wherein the grouping conveyor is at substantially right angles to the delivery conveyor.

3. The apparatus of claim 1, wherein the controller determines the count of the products in the group of products from a determination of gaps between product on the delivery conveyor and a sensed product length.

4. The apparatus of claim 3, wherein the sensed product length is determined by a calibrated speed of the delivery conveyor.

5. The apparatus of claim 4, wherein the controller determines an initial product count by the number of product gaps and adds additional counts in proportion of the sensed product length beyond a predetermined single product length.

6. The apparatus of claim 5, wherein the controller is configured to add one product count where the product length is substantially equal to the predetermined single product length and two product counts where the sensed product length is substantially greater than the predetermined single product length.

7. The apparatus of claim 5, wherein the controller is configured to add three product counts where the sensed product length is substantially greater than twice the predetermined single product length.

8. The apparatus of claim 1, wherein the plurality of containment areas is defined by a plurality of partitions.

9. The apparatus of claim 1, further comprising a chute for receiving the counted products in the group of products and for holding the counted products in the group of products until an empty container is available into which the counted products in the group of products can be deposited.

10. The apparatus of claim 1, wherein the controller is configured to increase a speed of the grouping conveyor during the discharge sequence from a first grouping conveyor moving speed to a moving speed faster than the initial grouping conveyor moving speed and slow a speed of the delivery conveyor during the discharge sequence from an initial delivery conveyor moving speed to a moving speed slower than the initial delivery conveyor moving speed.

11. A method of counting, grouping and discharging products, comprising the steps of:
   counting distributed products in a group of products on a delivery conveyor;
   delivering the counted products in the group of products to a plurality of containment areas on a grouping conveyor; and
   discharging the counted products in the group of products from the grouping conveyor upon reaching a predetermined count of the products in the group of products.

12. The method of claim 11, wherein the step of counting the distributed products comprises the steps of:
   counting gaps between the products in the product group; and
   measuring a length of gaps between the products in the product group.

13. The method of claim 11, further comprising the steps of:
   orienting the products in the product group on the delivery conveyor in a generally common orientation; and
   maintaining orientation of the counted products in the group of products after delivery to the grouping conveyor.

14. The method of claim 11, wherein the step of discharging the products comprises the steps of:
   increasing a speed of the grouping conveyor from an initial grouping conveyor moving speed to a moving speed faster than the initial grouping conveyor moving speed; and
   slowing the speed of the delivery conveyor from an initial delivery conveyor moving speed to a moving speed slower than the initial delivery conveyor moving speed.

15. The method of claim 11, wherein the distributed products are distributed irregularly.

\* \* \* \* \*